United States Patent [19]

Raoulx

[11] 3,800,710
[45] Apr. 2, 1974

[54] STOPPING STATIONS OF A POWER AND FREE CONVEYOR

[75] Inventor: Jean Raoulx, Vaires, France

[73] Assignee: Jervis B. Webb International Company, Detriot, Mich.

[22] Filed: Jan. 22, 1973

[21] Appl. No.: 325,951

[30] Foreign Application Priority Data
Jan. 31, 1972 France.................... 72.03180

[52] U.S. Cl. ............ 104/251, 104/172 S, 104/252
[51] Int. Cl. ...................... B61h 9/00, B65g 17/42
[58] Field of Search ....... 104/172 S, 178, 249, 250, 104/251, 252, 253

[56] References Cited
UNITED STATES PATENTS

| 3,434,431 | 3/1969 | Dehne | 104/172 S |
| 3,085,659 | 4/1963 | Ashmead | 104/250 |

FOREIGN PATENTS OR APPLICATIONS

| 885,905 | 1/1962 | Great Britain | 104/252 |
| 514,090 | 11/1930 | Germany | 104/252 |

Primary Examiner—Robert G. Sheridan
Assistant Examiner—Robert Saifer
Attorney, Agent, or Firm—Farley, Forster and Farley

[57] ABSTRACT

A stopping station for a power and free conveyor in which the main dog of a carrier on a carrier track is retracted and disengaged from a pusher on a propelling chain by a stop plate movable between stopping and non-stopping positions. Forwarding movement of the carrier is arrested by the combination of a fixed laterally extending abutment on the carrier, a pivoted abutment mounted on the carrier track and engageable by the carrier abutment, a fixed abutment mounted on the carrier track and spaced from the pivoted abutment in the forwarding direction of carrier movement, and a blocking device movable with the stop plate. In the stopping position, the blocking device is interposed between the pivoted and fixed track-mounted abutments and prevents the pivoted abutment from moving when engaged by the carrier abutment.

5 Claims, 7 Drawing Figures

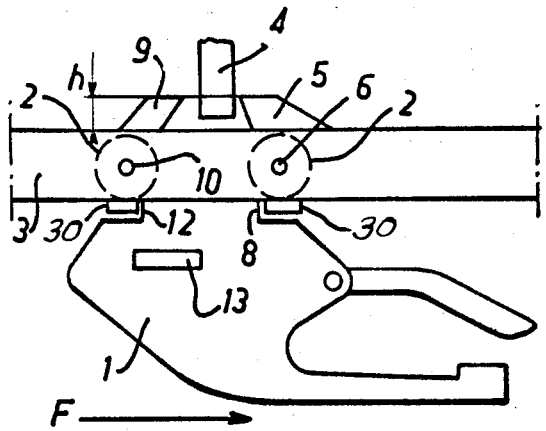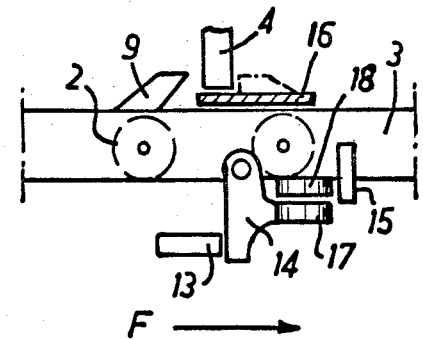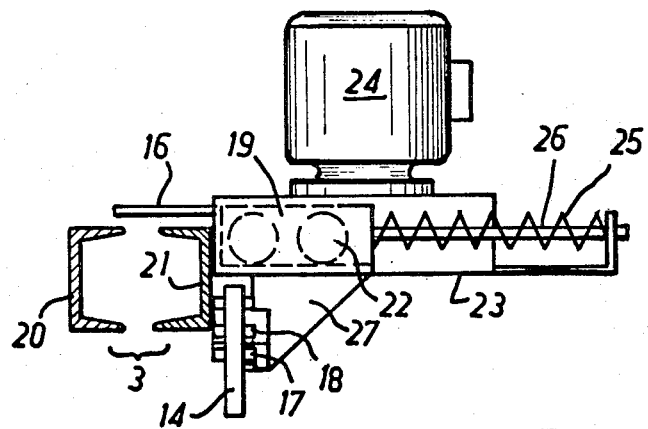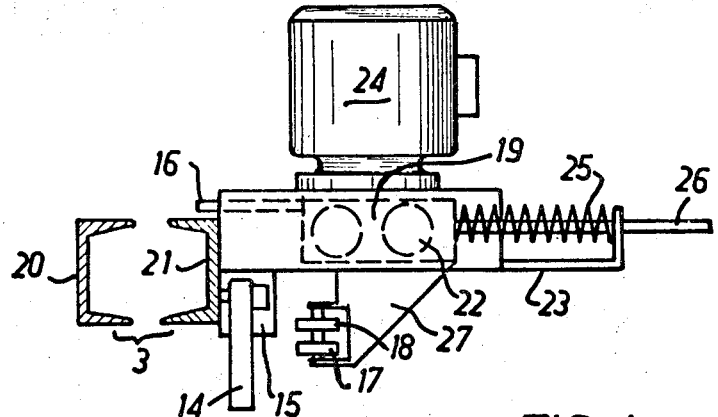

STOPPING STATIONS OF A POWER AND FREE CONVEYOR

The present invention relates to an improvement in the stopping stations of a conveyor of the power and free type.

A conveyor of the above type has been described in U.S. Pat. No. 3,229,645, comprising a track for load carriers and an adjacent track carrying a propulsion member in the form of an endless chain provided at regular intervals with driving pushers for the said load carriers. A load carrier or trolley comprises rollers supported on the carrier track, constituted by two U-section bars, the concave portions of which face each other, a hook-on device for a conveyor pallet between two consecutive trolleys, a driving device and a stopping device.

The driving device is constituted by a retractable driving dog and a holdback dog, these two dogs ensuring the interlocking between each other of a driving pusher. More particularly, the holdback dog is lower than the driving dog, so that a movable stop plate mounted on the carrier track can be introduced into the path of travel of the two dogs to retract the driving dog and be abutted by the holdback dog, the lower height of this latter dog permitting the pusher normally driven by the endless chain to pass over it.

An installation of this kind, in which the track of the chain is arranged vertically above the track of the carriers, requires that at the stopping station, the two tracks are farther apart from each other than over the remainder of the travel, that is to say, in fact, the track of the chain is raised.

As a pusher is kept locked between the two dogs during the movement of a carrier trolley, and the holdback dog does not come into contact with a pusher at the stopping station, it is essential that the track of the chain should be raised at the position of the said stopping station.

This arrangement results in particular in the following drawbacks:

The space between the tracks of the carriers and the chain having to be increased in order to install the stopping device, the stopping station may have an overall size which may be troublesome;

Due to this increase in the distance between the tracks, the carrier trolley is not locked on the pusher when it comes into contact with the stopping device or when it leaves this latter, due to the fact that the holdback dog cannot be engaged with the pusher;

All the impact forces in the stopping movement of the carrier trolley are absorbed by the movable stop member and the holdback dog;

A relatively large force may be necessary in order to open the stop member, by reason of the frction existing between the stop plate and the holdback dog;

Furthermore, when the stop member is open and the driving dog projects into the path of a pusher, the resulting contact between the pusher and the driving dog may cause the carrier trolley to rebound forward beyond the pusher, especially if there is a downward slope of the carrier track following the stopping station. Due to the fact that at this instant the holdback dog cannot be engaged by a pusher as a result of the large spacing existing between the two tracks, the carrier trolley may become freed from the pusher and is thus no longer under control.

The invention is thus directed to an improved stopping station which obviates the above drawbacks and offers substantially an appreciable decrease in overall size due to the fact that the two tracks have a substantially constant distance apart over the whole of the travel of the conveyor, and also offers safety in the event of incorrect operation of the control members of the stop plate.

The stopping station according to the invention, for a power and free conveyor of the type comprising at least one load carrier trolley provided with a retractable driving dog, driving said trolley in an upstream-downstream direction by means of a pusher mounted on an operating chain, and comprising a stop plate movable between a passage position and a stopped position of the trolley and retracting the driving dog in this latter position in order to disengage it from the pusher, is essentially characterized by the fact that it comprises, in combination:

On the trolley, a first fixed lateral abutment;

on the track of the said trolley, in the upstream-downstream direction of movement, a lateral pivoted abutment followed by a second lateral fixed abutment, both arranged on the same side as the said first fixed abutment;

on a carriage fixed with respect to the stop plate, movable in translation perpendicularly with respect to the said track, between a stopped position and a passage position of the trolley, two coaxial rollers on a vertical axis, arranged in the stop position between the said pivoted abutment and the said second fixed abutment.

According to other characteristic features:

The carriage fixed with respect to the stop plate is provided with a driving member and a restoring device;

The driving member is intended to displace said carriage between the stopped position and the passage position of the trolley, the stopped position being normally maintained by a restoring spring;

The stopping station further comprises a safety device constituted by an articulated lever actuated by guiding rollers of the trolley and connected to the carriage which carries the stop plate.

Other characteristic features and advantages of the present invention will be more clearly brought out in the description which follows below of one possible form of construction of the stopping station according to the invention, reference being made to the accompanying drawings, in which:

FIG. 1 represents a diagrammatic profile view of a trolley on its rolling track;

FIG. 2 represents a diagrammatic profile view of the main associated stopping members;

FIGS. 3 and 4 show diagrammatic views of the movable carriage, in the stopped position and in the passage position of the trolley respectively;

In these drawings, the same references are applied to the same elements.

Figure 7:
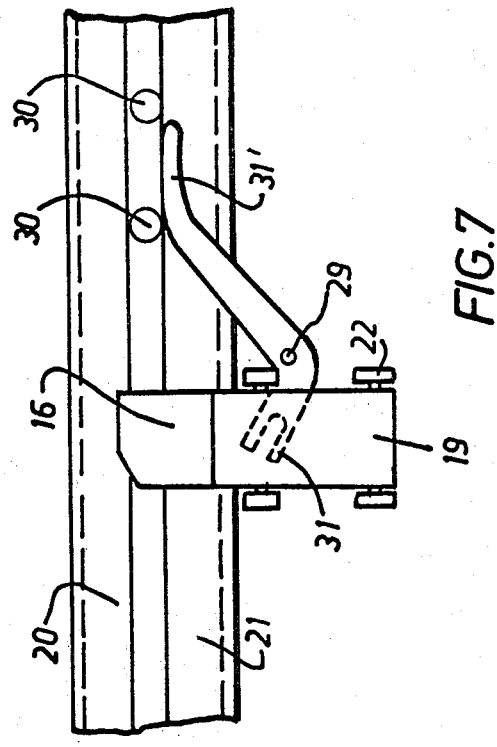
FIGS. 6 and 7 show diagrammatic views looking on the top of an additional safety device.

Referring to FIG. 1, a trolley 1 is supported by rollers 2 on a track 3, and is driven in the upstream-downstream direction, illustrated by the arrow F, by means of a pusher 4 which is in turn rigidly fixed on an endless chain carried by an adjacent track (not shown) arranged at a substantially constant distance vertically above the track 3.

According to the invention, the trolley 1 comprises a driving dog 5 operating by contact with the pusher 4. This dog 5 is retractable by downward movement in a manner known per se, and also, a holdback dog 9 is retractable by pivoting only in the upstream-downstream direction about an axis 10. The trolley further comprises a fixed lateral abutment 13, the purpose of which will be explained below. In the driving position, the two dogs 5 and 9 lock with the pusher 4, their height H in this raised position being substantially the same.

Referring now to FIG. 2, the track 3 is provided with a pivoted abut-ment 14 and a fixed abutment 15, these two abutments being mounted laterally on the same side as the abutment 13. During the stopping of the trolley, which will be explained in more detail below, a stop plate 16 is arranged above the track 3 and retracts the driving dog 5, thus freeing the pusher 4, which continues its travel. Two coaxial rollers 17 and 18 on a vertical axis are simultaneously interposed between the abutments 14 and 15. The abutment 13 is blocked against the abutment 14 which is in turn blocked on the lower roller 17, the upper roller 18, mounted on the same shaft, being blocked on the abutment 15 of the track. During the stopping of the trolley, the holdback dog 9 can pivot freely without encountering the plate 16 if it comes into contact with a pusher following that which has just been freed.

Referring to FIGS. 3 and 4, the stop plate 16 is actuated by a carriage 19, movable in translation perpendicularly with respect to the longitudinal axis of the track 3, constituted, in a manner known per se, by two U-section bars 20 and 21, on the lower horizontal portion of which are supported the rollers 2 of the trolley (not shown in this figure).

The carriage 19, supported by means of rollers 22 on a plate 23, is displaceable by means of an appropriate motor 24 into the stopped position (FIG. 3) and into the passage position (FIG. 4) of the trolley, and is normally held in the stopped position elastically by the action of a return spring 25 mounted on a shaft 26. An appropriate bracket 27, fixed on the carriage 19, carries the two coaxial rollers 17 and 18 having a vertical axis.

Figure 5:
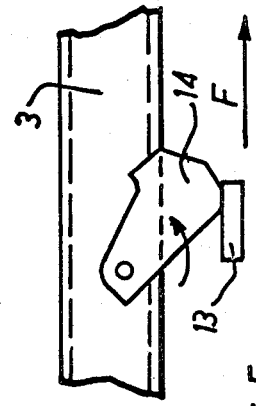
FIG. 5 represents a profile view of the position of the pivoted abut-ment on the passage of a trolley.

The operation is as follows: the carriage 19 being normally in the stopped position, in order to leave a free passage for a trolley, it is necessary to bring the carriage 19 into the passage position by means of the motor 22. In this passage position, the fixed abutment 13 of a trolley (FIG. 5) passes the abutment 14 of the track by pivotal movement of this abutment.

For stopping a trolley, the plate 16 overlapping the upper part of the track 3 above which projects the dogs 5 and 9, retracts the driving dog 5 and frees the pusher 4. The rollers 17 and 18 are inserted between the abutments 14 and 15, the abutment 14 blocking the trolley by the abutment 13 of this latter. Due to the low coefficient of friction of the rollers 17 and 18, the power required to move the stop plate 16 is very small.

In the event of failure of the control of the carriage 19 in the passage position, the spring 25 acts as a safety device or restoring means holding the plate 16 in the stopped position.

Figure 6:
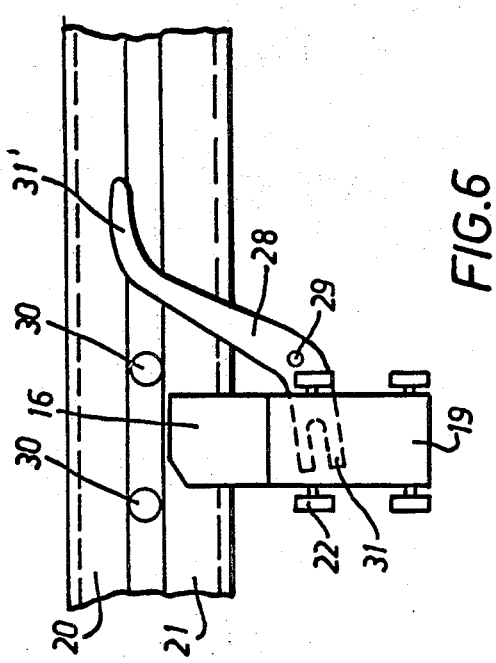

Referring now to FIGS. 6 and 7, a further safety device or restoring means may be constituted by a lever 28 pivoted about a shaft 29 and mounted below the track 3, on the lower part of which are inserted the guiding rollers 30 of the trolley, between the bars 20 and 21. One extremity of the lever 28 is terminated by a fork 31, the arms of which grip a nipple (not shown) fixed on the carriage 19. The other extremity 31' of the said lever is rounded and it is arranged on the path of the guiding rollers 30 (see FIG. 6). The passage of an unblocked trolley then causes the lever 28 to pivot by contact of the rollers 30 with the extremity 31', thus bringing the plate 16 into the stopped position with respect to the next following carrier, it being understood that a load may be conveyed, in a manner known per se on a pallet suspended from two consecutive trolleys.

The stopping station according to the invention does not necessitate any additional space between the tracks of the trolleys and the driving chain respectively, for its installation. The force necessary in order to cause the stop member to pass from the stopped position to the passage position is the force required to overcome the friction of the stop device on the abutments, this force being very small by reason of the low coefficient of friction offered by the rollers 17 and 18.

It will of course be understood that the present invention has been described and illustrated only by way of a preferred example, and that any technical equivalents may be added to its constituent elements without thereby departing from the scope of the said invention, as defined in the appended claims.

I claim:

1. A stopping station for a power and free conveyor including a track supporting a carrier having a retractable driving dog, an adjacent track supporting a chain having a pusher engageable with the driving dog to propel the carrier in a forwarding direction, and a stop plate movable between a non-stopping and a stopping position with respect to the carrier, the stop plate in the stopping position being capable of retracting and disengaging the driving dog from the pusher, wherein the improvement comprises:
   a laterally extending fixed abutment mounted on the carrier;
   a pivoted abutment mounted on the carrier track at the stopping station and movable by the fixed abutment on the carrier, and a fixed abutment mounted on the carrier track in spaced relation from the pivoted abutment in the forwarding direction; and,
   a blocking device movable with the stop plate, the blocking device in the stopping position of the stop plate being interposed between the pivoted and fixed abutments on the carrier track and preventing movement of the pivoted abutment by the fixed abutment on the trolley.

2. A stopping station according to claim 1 wherein the blocking device comprises a pair of coaxially mounted rollers one of which is engageable by the pivoted abutment and the other of which is engageable by the fixed abutment on the carrier track.

3. A stopping station according to claim 1 wherein the stop plate is mounted on a carriage, driving means for moving the carriage to the non-stopping position of the stop plate, and restoring means for returning the carriage to the stopping position of the stop plate.

4. A stopping station according to claim 3 wherein the restoring means comprises a spring.

5. A stopping station according to claim 3 wherein the restoring means comprises a lever connected to the carriage and having a portion engageable by a carrier when the carriage is in the non-stopping position of the stop plate.

* * * * *